United States Patent
Liu et al.

(10) Patent No.: US 10,595,368 B2
(45) Date of Patent: Mar. 17, 2020

(54) LED DRIVING CIRCUIT AND METHOD FOR BALANCING EFFICIENCY AND POWER FACTOR

(71) Applicant: CHINA RESOURCES POWTECH (SHANGHAI) CO., LTD., Shanghai (CN)

(72) Inventors: Jun Liu, Shanghai (CN); Quanqing Wu, Shanghai (CN); Shengsheng Lu, Shanghai (CN); Guocheng Li, Shanghai (CN)

(73) Assignee: CHINA RESOURCES POWTECH (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/755,014

(22) PCT Filed: Dec. 30, 2016

(86) PCT No.: PCT/CN2016/113738
§ 371 (c)(1),
(2) Date: Feb. 23, 2018

(87) PCT Pub. No.: WO2017/219649
PCT Pub. Date: Dec. 28, 2017

(65) Prior Publication Data
US 2019/0246466 A1    Aug. 8, 2019

(30) Foreign Application Priority Data
Jun. 22, 2016 (CN) .......................... 2016 1 0457436

(51) Int. Cl.
*H05B 33/08* (2006.01)
(52) U.S. Cl.
CPC ....... *H05B 33/0815* (2013.01); *H05B 33/083* (2013.01); *H05B 33/0827* (2013.01)

(58) Field of Classification Search
CPC .... H05B 33/02; H05B 33/08; H05B 33/0803; H05B 33/0806; H05B 33/0815; H05B 33/0827; H05B 33/083
See application file for complete search history.

(56) References Cited

U.S. PATENT DOCUMENTS

| 8,487,546 B2 * | 7/2013 | Melanson ........... | H05B 33/0815 315/291 |
| 2010/0156325 A1 * | 6/2010 | Nelson ............... | H05B 33/0803 315/307 |

(Continued)

FOREIGN PATENT DOCUMENTS

| CN | 1802056 A | 7/2006 |
| CN | 103281834 A | 9/2013 |

*Primary Examiner* — Jason Crawford
(74) *Attorney, Agent, or Firm* — Global IP Services; Tianhua Gu

(57) ABSTRACT

A LED driving circuit and method for balancing efficiency and a power factor. The circuit comprises a voltage input module, an LED load, a constant current control module and a current turn-off slope control module for adjusting the turn-off slope of the current flowing through the LED load, such that a compromise between efficiency and power factor is achieved. When an input voltage is higher than a setting voltage, the current flowing through the LED load is turned off, such that the power consumption is reduced; in addition, the efficiency and power factor are balanced by adjusting the turn-off slope of the current. According to the present invention, a compensation capacitor is used to control the average current in an alternating current period and to limit peak current, thereby implementing constant power output within a wide range of input voltage.

7 Claims, 5 Drawing Sheets

(56) References Cited

U.S. PATENT DOCUMENTS

| | | | |
|---|---|---|---|
| 2010/0207536 A1* | 8/2010 | Burdalski | H05B 33/0815 315/224 |
| 2012/0262075 A1* | 10/2012 | Lynch | H05B 33/0818 315/192 |
| 2013/0119881 A1* | 5/2013 | Fang | H05B 33/0815 315/210 |
| 2014/0035474 A1* | 2/2014 | Kuo | H05B 33/0848 315/200 R |
| 2015/0137688 A1* | 5/2015 | Gibbs | H05B 33/0827 315/186 |
| 2019/0124735 A1* | 4/2019 | Liu | H05B 33/0815 |

* cited by examiner

US 10,595,368 B2

LED DRIVING CIRCUIT AND METHOD FOR BALANCING EFFICIENCY AND POWER FACTOR

CROSS REFERENCE TO RELATED PATENT APPLICATION

The present application is the US national stage of PCT/CN2016/113738 filed on Dec. 30, 2016, which claims the priority of the Chinese patent application No. CN201610457436.2 filed on Jun. 22, 2016, which applications are incorporated herein by reference.

TECHNICAL FIELD

The present invention relates to technical field of circuit design, and in particular to an LED driving circuit and a method for balancing efficiency and a power factor.

BACKGROUND

LEDs (Light Emitting Diode) are semiconductor electronic components capable of emitting light, and such electronic components can only emit red light having a low-luminosity in the early stage. With the continuous improvements of technology, the electronic components have been developed to emit visible light, infrared light and ultraviolet light, and there are also great improvements in the luminosity. LEDs have advantages that cannot be incomparable by traditional light sources, such as high efficiency, long life, low damage possibility, high switching speed and high reliability, and have been widely used in fields of indicator lights, displays and lighting.

The power factor (PF) refers to the cosine of a phase difference between an input voltage and an input current. A low power factor will increase the loss of a power grid. Efficiency (EFF) is the ratio of a turn-on voltage of an LED to an input voltage, which satisfies the following relationship:

$$Eff = \frac{V_{LED}}{V_{IN}};$$

low efficiency will increase the loss of a power supply. In general, in a linear LED driver, the PF value of its system is usually very high in the case of a high input voltage, but the efficiency is relatively low and the PF and the efficiency cannot be simultaneously taken into account.

FIG. 1 illustrates a common structure of a single-segment linear LED driver, wherein an AC voltage is converted into an input voltage $V_{IN}$ through a rectifier bridge, and supplies power for an LED light segment; the LED light segment consists of n LED lights connected in series; an output terminal of the LED segment is connected with a constant current control chip, and the constant current control is realized through the switching of a constant current control transistor in the constant current control chip; a capacitor C and a resistor R are connected in parallel with the two terminals of the input voltage to serve as adjustable devices. FIG. 2 illustrates an operating waveform of the above-mentioned single-segment linear LED driver structure. During different input voltage $V_{IN}$ periods, the higher the amplitude of the input voltage $V_{IN}$ is, the larger the power factor of the system will be. On the contrary, the higher the magnitude of the input voltage $V_{IN}$ is, the lower the efficiency of the system will be.

As shown in FIG. 3, a HIGH-VOLTAGE DROP CURRENT TECHNOLOGY during which the current should be reduced if the voltage is excessively high may generally be used to reduce an output current under a high input voltage, thus reducing the system loss and heat generation and improving the efficiency, but the power factor will decline in this case.

Therefore, the efficiency and the power factor are in inverse proportion. How to balance the efficiency and the power factor in the LED driving control and realize the compromise control of the efficiency and the power factor has become one of the problems to be urgently solved by those skilled in the art.

SUMMARY

In view of the above shortcomings of the prior art, the object of the present invention is to provide an LED driving circuit and method for balancing efficiency and a power factor, for solving the problem that efficiency and the power factor cannot be simultaneously optimized in the prior art.

In order to achieve the above object and other related objects, the present invention provides an LED driving circuit for balancing efficiency and a power factor, wherein the LED driving circuit for balancing efficiency and a power factor at least comprises:

A voltage input module, an LED load, a constant current control module and a current turn-off slope control module;

The voltage input module is configured to provide an input voltage;

The LED load is connected to an output terminal of the voltage input module and is powered by the voltage input module;

The constant current control module is connected to an output terminal of the LED load to perform constant current control to the LED load;

The current turn-off slope control module is connected to an input terminal or an output terminal of the LED load, and when the input voltage is higher than a set voltage, the current turn-off slope control module outputs a turn-off signal to linearly turn off the current flowing through the LED load and realize a compromise between efficiency and a power factor by adjusting the turn-off slope of the current flowing through the LED load.

Preferably, the current turn-off slope control module comprises a first resistor, a second resistor, a constant current source and an over-voltage detecting unit; one terminal of the first resistor is connected to the output terminal of the LED load, and another terminal of the first resistor is connected to the second resistor and is then grounded; one terminal of the constant current source is connected between the first resistor and the second resistor, and another terminal of the constant current source is grounded; the over-voltage detecting unit is connected between the first resistor and the second resistor to generate a turn-off signal; a turn-off slope of the current flowing through the LED load is adjusted through the first resistor, the second resistor and the constant current source.

Preferably, the constant current control module comprises: a power switch transistor, a sampling resistor, a first reference voltage generation unit, and a comparison unit; a drain terminal of the power switch transistor is connected to the output terminal of the LED load, and a source terminal of the power switch transistor is grounded via the sampling resistor; an input terminal of the first reference voltage generation unit is connected to the current turn-off slope control module; a first input terminal of the comparison unit is connected to the source terminal of the power switch transistor, a second input terminal of the comparison unit is connected to the first reference voltage generation unit, and an output terminal of the comparison unit is connected to a gate terminal of the power switch transistor.

More preferably, the constant current control module is connected to the input terminal of the LED load.

In order to achieve the above object and other related objects, the present invention further provides a method for driving the LED driving circuit for balancing efficiency and a power factor as stated above, the method for driving the LED driving circuit for balancing efficiency and a power factor at least comprises the following steps: turning on the power switch transistor, and when an input voltage is higher than a turn-on voltage of the LED load, the LED load is turned on, and the constant current control module performs constant current control to the current flowing through the LED load;

The input voltage continuous to increase, and when the input voltage is higher than a set voltage, the current turn-off slope control module outputs a turn-off signal to linearly turn off the current flowing through the LED load so as to further reduce power consumption and improve efficiency and meanwhile realize a compromise between efficiency and a power factor through adjusting a turn-off slope of the current flowing through the LED load;

Then the input voltage drops, and when the input voltage is lower than the set voltage, the turn-off signal is disabled, and the constant current control module performs constant current control to the current flowing through the LED load; and The input voltage continues to drop, and when the input voltage is lower than the turn-on voltage of the LED load, the LED load is turned off.

Preferably, the sampling resistor samples a voltage at a source terminal of the power switch transistor to obtain a sampling voltage, compares the sampling voltage with a first reference voltage and outputs a driving voltage to drive the power switch transistor so as to achieve a constant current control.

Preferably, the specific method to set a turn-off slope of the current flowing through the LED load is detecting an output terminal voltage of the LED load to set a dropping point and a turn-off point of the current flowing through the LED load.

More preferably, when the detected voltage increases from zero to a second reference voltage, the current flowing through the LED load drops gradually; and when the detected voltage is higher than the second reference voltage, the current flowing through the LED load is turned off.

More preferably, when the detected voltage begins to increase from zero, the output terminal voltage of the LED load is $I1*R1$, wherein $I1$ refers to a constant current of the constant current source, and $R1$ refers to a resistance of the first resistor.

More preferably, when the detected voltage is a second reference voltage, the output terminal voltage of the LED load is $(Vref2/R2+I1)*R1+Vref2$, wherein $Vref2$ refers to the second reference voltage, $I1$ refers to a constant current of the constant current source, $R1$ refers to a resistance of the first resistor, and $R2$ refers to a resistance of the second resistor.

As described above, the LED driving circuit and method for balancing efficiency and a power factor provided in the present invention have the following beneficial effects:

1. According to the LED driving circuit and method for balancing efficiency and a power factor provided in the present invention, the turn-off voltage of an LED is adjusted by an external resistor, and the LED is turned off to achieve high efficiency of the system when the input voltage is relatively high.

2. According to the LED driving circuit and method for balancing efficiency and a power factor provided in the present invention, the turn-off slope of the LED is adjusted through an external resistor to achieve a compromise between efficiency and the power factor and also optimize the electromagnetic interference performance of the system.

3. According to the LED driving circuit and method for balancing efficiency and a power factor provided in the present invention, the structure of the current source is adopted to realize the effect of setting two mutually independent voltage detection points through one pin, thus reducing the pin number of a chip and achieving the simplest peripheral circuit.

DESCRIPTIONS OF COMPONENT REFERENCE NUMERALS

Figure 1:
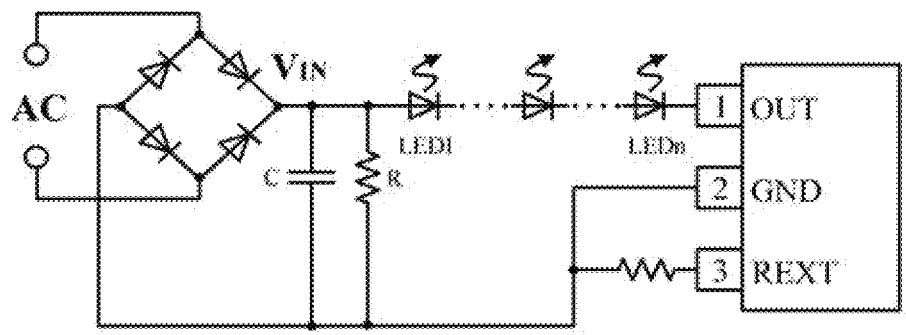
FIG. 1 shows a schematic structural diagram of a single-segment linear LED driver in the prior art.
Figure 2:
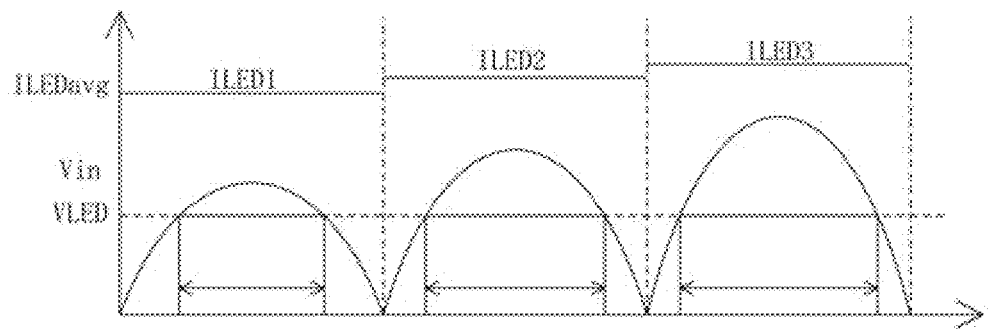
FIG. 2 shows a schematic diagram of operating waveforms of a single-segment linear LED driver in the prior art.
Figure 3:
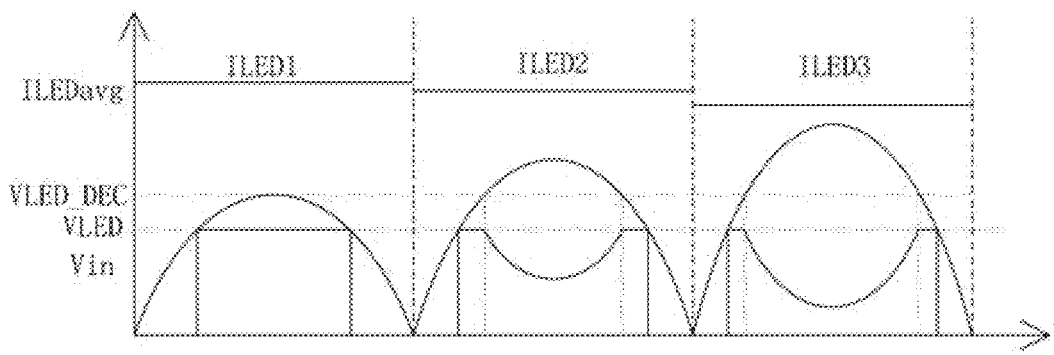
FIG. 3 shows a schematic diagram of operating waveforms of the HIGH-VOLTAGE DROP CURRENT TECHNOLOGY during which the current should be reduced if the voltage is excessively high in the prior art.

1 LED driving circuit for balancing efficiency and a power factor
11 Voltage input module
12 LED load
13 Constant current control module
131 First reference voltage generating unit
132 comparison unit
14 Current turn-off slope control module
141 Over-voltage detecting unit
15 Operating voltage generation circuit

DETAILED DESCRIPTION OF THE PREFERRED EMBODIMENTS

The implementation modes of the present invention will be described below through specific examples. One skilled in the art can easily understand other advantages and effects of the present invention according to contents disclosed in the description. The present invention may also be implemented or applied through other different specific implementation modes. Various modifications or variations may be made to all details in the description based on different points of view and applications without departing from the spirit of the present invention.

Reference is made to FIGS. 4-7. It needs to be stated that the drawings provided in the embodiments are just used for schematically describing the basic concept of the present invention, thus only illustrate components only related to the present invention and are not drawn according to the numbers, shapes and sizes of components during actual implementation, the configuration, number and scale of each component during actual implementation thereof may be freely changed, and the component layout configuration thereof may be more complex.

Embodiment 1

Figure 4:
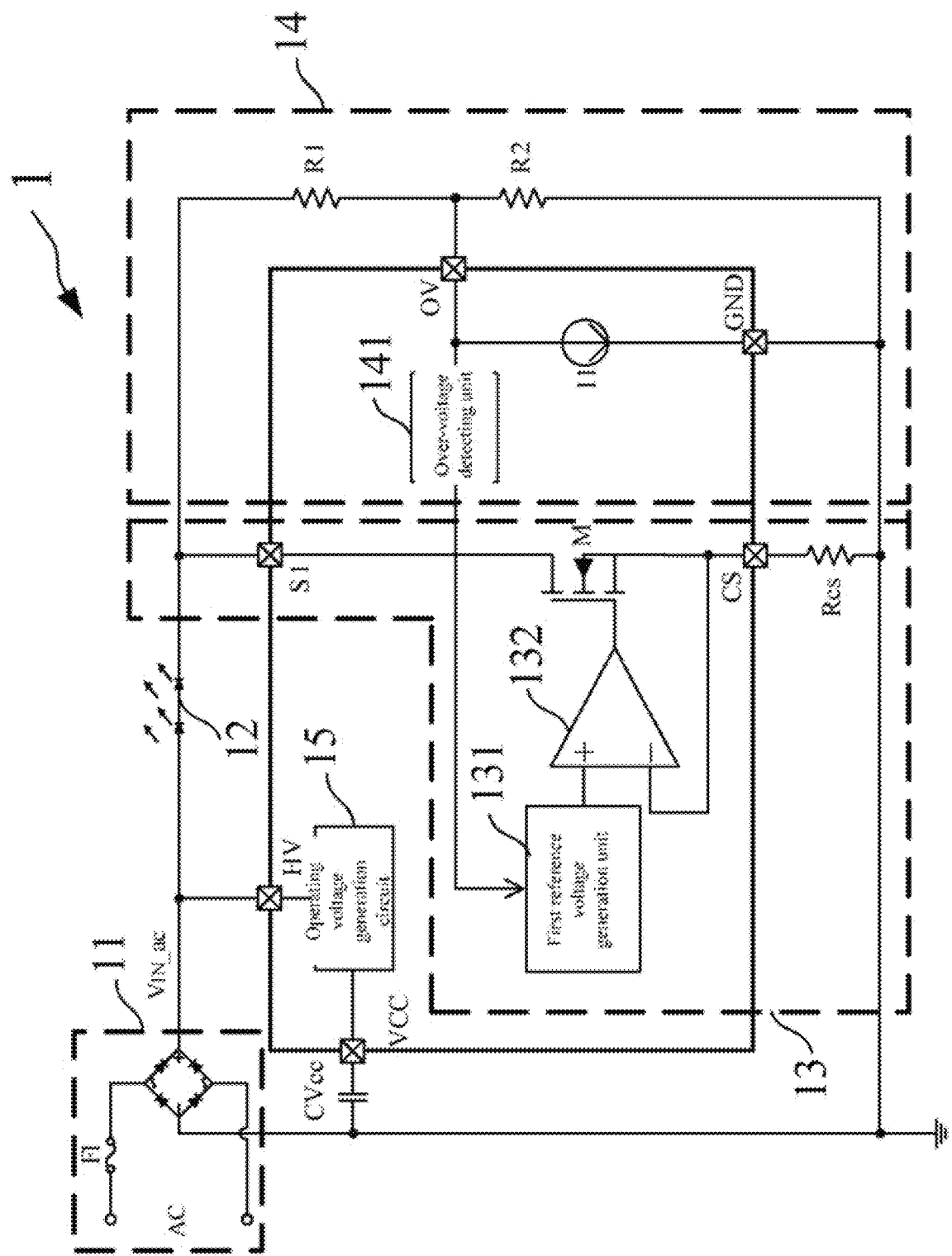
FIG. 4 shows a schematic diagram of an embodiment of an LED driving circuit for balancing efficiency and a power factor according to the present invention.

As shown in FIG. 4, the present invention provides an LED driving circuit 1 for balancing efficiency and a power factor, wherein the LED driving circuit 1 for balancing efficiency and a power factor at least includes:

A voltage input module 11, an LED load 12, a constant current control module 13, a current turn-off slope control module 14, and an operating voltage generation circuit 15.

As shown in FIG. 4, the voltage input module 11 is configured to provide an input voltage $V_{IN\_}ac$.

Specifically, as shown in FIG. 4, the voltage input module 11 is an off-chip device and includes an alternating current power supply AC, a fuse F1 and a rectifying unit. The rectifying unit includes two groups of diodes connected in parallel. Each group of diodes includes two diodes connected in series. The alternating current power supply AC is connected between two diodes in each group via the fuse F1. The voltage input module 11 provides the input voltage $V_{IN\_}ac$, and the input voltage $V_{IN\_}ac$ is a rectified voltage rectified by a sinusoidal voltage that is continuously increased or decreased.

As shown in FIG. 4, the LED load 12 is connected to an output terminal of the voltage input module 11 and is powered by the voltage input module 11.

Specifically, as shown in FIG. 4, the LED load 12 is an off-chip device and includes a plurality of LED lights connected in series. The LED load 12 may also be a structure with a plurality of LED lights connected in parallel and in series, which is not limited to this embodiment. The voltage input module 11 supplies power to the LED load 12. When Voltages at two ends of the LED load 12 reach its turn-on voltage, the LEDs in the LED load 12 light up to achieve a lighting effect.

As shown in FIG. 4, the constant current control module 13 is connected to an output terminal of the LED load 12 to perform constant control to the LED load;

Specifically, as shown in FIG. 4, the constant current control module 13 includes a power switch transistor M, a sampling resistor Rcs, a first reference voltage generation unit 131 and a comparison unit 132.

More specifically, as shown in FIG. 4, a drain terminal of the power switch transistor M is connected to the output terminal of the LED load 12, and the control of the constant current of the LED load 12 is realized by turning on and turning off of the power switch transistor M. In this embodiment, the power switch transistor M is an N-type MOS transistor. In actual use, the type of the power switch transistor is not limited. The power switch transistor M is an on-chip device, and the drain terminal of the power switch transistor M is connected with an off-chip device through an S1 port.

More specifically, as shown in FIG. 4, one terminal of the sampling resistor Rcs is connected to a source terminal of the power switch transistor M, and another terminal of the sampling resistor Rcs is grounded for sampling a current flowing through the power switch transistor M and converting it into a sampling voltage $V_{CS}$. In this embodiment, the sampling resistor Rcs is an off-chip device and is connected to the source terminal of the power switch transistor M inside a chip through a CS terminal.

More specifically, as shown in FIG. 4, an input terminal of the first reference voltage generation unit 131 is connected to the current turn-off slope control module 14. In this embodiment, a set value is output as the first reference voltage Vref1 when the turn-off signal output by the current turn-off slope control module 14 is disabled; when the turn-off signal output by the current turn-off slope control module 14 is enabled, the first reference voltage Vref1 is adjusted by the turn-off signal to linearly turn off the power switch transistor M.

More specifically, as shown in FIG. 4, in this embodiment, an negative input terminal of the comparison unit 132 is connected to the source terminal of the power switch transistor, a positive input terminal of the comparison unit 132 is connected to the first reference voltage generation unit 131, and an output terminal of the comparison unit 132 is connected to a gate terminal of the power switch transistor M. The comparison unit 132 compares the sampling voltage $V_{SC}$ with the first reference voltage Vref1 to generate a switching signal of the power switch transistor M, thereby realizing the control of the constant current of the LED load 12.

The current turn-off slope control module 14 is connected to an input terminal or an output terminal of the LED load, and when the input voltage $V_{IN\_}ac$ is higher than a set voltage, the current turn-off slope control module 14 outputs a turn-off signal to linearly turn off a current flowing through the LED load 12 and realizes a compromise between efficiency and a power factor by regulating the turn-off slope of the current flowing through the LED load 12. As shown in FIG. 4, in this embodiment, the current turn-off slope control module 14 is connected to the output terminal of the LED load 12 to detect a drain terminal voltage $V_{S1}$ of the power switch transistor M. In this embodiment, the set voltage is higher than the operating voltage of the LED load 12. Those skilled in the art can understand that as the input voltage $V_{IN\_}ac$ increases, the LED load 12 is gradually turned on and the voltages at both terminals are stabilized at the operating voltage; as the input voltage $V_{IN\_}ac$ continues to increase, the excess voltage is withstood by the power switch transistor M, which inevitably leads to low efficiency. Therefore, those skilled in the art can set the set voltage for turning off the current flowing through the LED load 12 according to requirements of different operating current and operating voltage, and the specific values are not limited one by one.

Specifically, as shown in FIG. 4, the current turn-off slope control module 14 includes a first resistor R1, a second resistor R2, a constant current source I1, and an over-voltage detection unit 141. In this embodiment, the first resistor R1 and the second resistor R2 are off-chip devices, and the constant current source I1 and the over-voltage detecting unit 131 are on-chip devices. One terminal of the first resistor R1 is connected to a drain terminal S1 of the power switch transistor M, and another terminal of the first resistor R1 is connected to the second resistor R2 and is then grounded. One terminal of the constant current source I1 is connected between the first resistor R1 and the second resistor R2 and another terminal of the constant current source I1 is grounded. The drain terminal voltage $V_{S1}$ of the power switch transistor M is detected by the first resistor R1, the second resistor R2 and the constant current source I1 to obtain a detected voltage $V_{OV}$. The over-voltage detection unit 131 is connected between the first resistor R1 and the second resistor R2 to compare the detected voltage $V_{OV}$ with an internal second reference voltage Vref2 (the second reference voltage Vref2 is obtained by dividing the set voltage through the first resistor R1, the second resistor R2 and the constant current source I1) to further obtain the turn-off signal and act on the constant current control module 13. The detected voltage $V_{OV}$ reflects the drain terminal voltage $V_{S1}$ of the power switch transistor M; two points of the drain terminal voltage $V_{S1}$ of the power switch transistor M are detected by the first resistor R1, the second resistor R2 and the constant current source I1, and the two points are respectively considered as a drop point and a turn-off point of the current flowing through the LED load 12. In this embodiment, when the drain terminal voltage $V_{S1}$ of the power switch transistor M is set as VLED_DEC, a current begins to flow through the current turn-off slope control module 14, the detected voltage $V_{OV}$ begins to rise from zero, and the turn-off signal begins to take effect, the amplitude of the turn-off signal is related to the detected voltage $V_{OV}$, and the first reference voltage generation unit 131 is controlled to adjust the first reference voltage Vref1 to start reducing the current flowing through the LED load 12; when the drain terminal voltage $V_{S1}$ of the power switch transistor M is set as VLED_OFF, the detected voltage $V_{OV}$ reaches a second reference voltage Vref2 inside the over-voltage detection unit 141, and the turn-off signal controls the first reference voltage generation unit 131 to adjust the first reference voltage Vref1 to completely turn off the current flowing through the LED load 12. In this embodiment, VLED_DEC is set as I1*R1, VLED_OFF is set as (Vref2/R2+I1)*R1+Vref2, where I1 refers to a constant current of the constant current source I1, R1 refers to a resistance of the first resistor R1, R2 refers to a resistance of the second resistor R2, and Vref2 refers to a second reference voltage Vref2 inside the over-voltage detection unit 141. The dropping point and the turn-off point of the current flowing through the LED load 12 can be changed by changing the values of the first resistor R1, the second resistor R2 and the constant current source I1, thus greatly improving the flexibility in adjusting efficiency and the power factor, and the specific values can be set specifically according to the system application environment and are not limited herein one by one. The dropping point and the turn-off point determine the turn-off slope of the current flowing through the LED load 12, and the slope can be specifically set according to a specific circuit. Different slopes show different efficiency and power factors.

As shown in FIG. 4, the LED driving circuit 1 for balancing efficiency and a power factor further includes an operating voltage generation circuit 15 which provides an operating voltage for each module.

Specifically, as shown in FIG. 4, the operating voltage generation circuit 15 is an on-chip device, one terminal of the operating voltage generation circuit 15 is connected to the output terminal of the voltage input module 11 through an HV port, electric energy is obtained from the voltage input module 11, and another terminal of the operating voltage generation circuit 15 is connected to an off-chip energy storage capacitor $C_{VCC}$ through a VCC port and is then grounded. The operating voltage generation circuit 15 saves the generated voltage VCC on the energy storage capacitor $C_{VCC}$ to ensure that there is still enough energy to maintain the operation of each module even though the input voltage $V_{IN\_}$ac is at the bottom.

Embodiment 2

Figure 5:
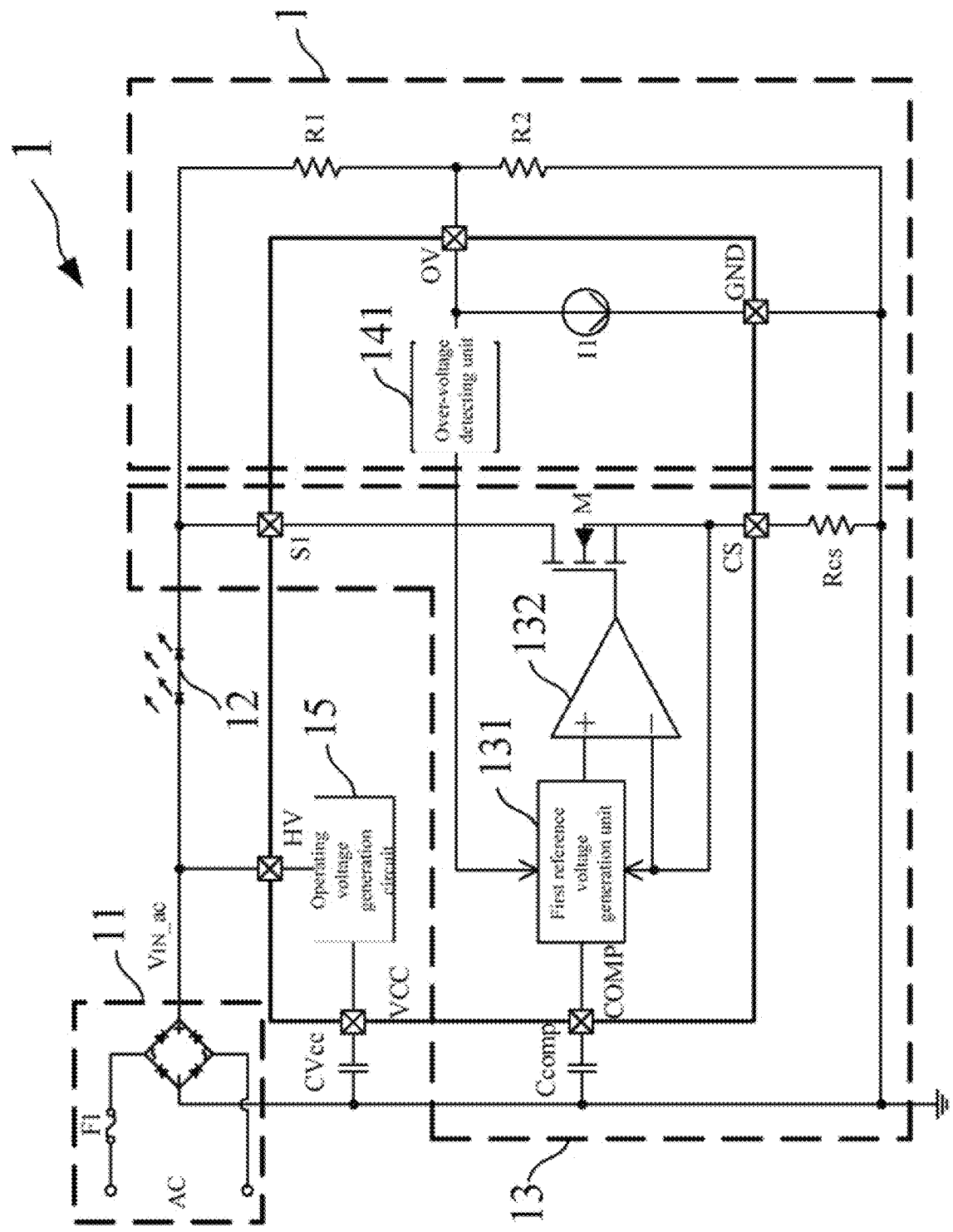
FIG. 5 shows a schematic diagram of another embodiment of the LED driving circuit for balancing efficiency and a power factor according to the present invention.

As shown in FIG. 5, the present invention provides an LED driving circuit for balancing efficiency and a power factor. The structure of the LED driving circuit is basically the same as that in the first embodiment, except that the first reference voltage generation unit 131 is further connected to a compensation capacitor Ccomp and the sampling voltage $V_{CS}$; the control of the average current in an AC period is achieved by integrating the compensation capacitor Ccomp and constant power output in a wide range of input voltage is realized by limiting a peak current; and meanwhile, the turn-off signal is received, the current flowing through the LED load is turned off when the turn-off signal is enabled, thereby reducing the power consumption.

Specifically, as shown in FIG. 5, the first reference voltage generation unit 131 is an on-chip device and is connected to the sampling resistor Rcs and a compensation capacitor Ccomp. The compensation capacitor Ccomp is an off-chip device, and the connection between the compensation capacitor and the first reference voltage generation unit 131 is realized through a COMP port. The first reference voltage generation unit 131 integrates generates the first reference voltage Vref1 for the integration of the compensation capacitor Ccomp, and the voltage on the compensation capacitor Ccomp determines the peak current flowing through the LED load 12. Through the integration of the compensation capacitor Ccomp, the current average value is constant in different input voltage periods, so as to realize the constant power output in a wide input voltage range. Moreover, the first reference voltage generation unit 131 receives the turn-off signal output by the current turn-off slope control module 14; the first reference voltage Vref1 is not affected when the turn-off signal is disabled; when the turn-off signal is enabled, the first reference voltage Vref1 is adjusted to turn off the power switch transistor M. In this embodiment, the output signal of the comparison unit 132 is inverted by decreasing the first reference voltage Vref1 to further turn off the power switch transistor M.

The structure of the constant current control module 13 may be any one of the prior art, which is not repeated here, includes but is not limited to the two types listed in Embodiment 1 and Embodiment 2.

As shown in FIGS. 4-7, the working principle of the LED driving circuit 1 for balancing efficiency and a power factor is as follows:

The power switch transistor M is turned on, and when an input voltage $V_{IN\_}$ac is higher than a turn-on voltage of the LED load 12, the LED load 12 is turned on, a current flows through the LED load 12 and the power switch transistor M, and the constant current control module 13 performs constant current control to the current flowing through the LED load;

The input voltage $V_{IN\_}$ac continuous to increase, and when the input voltage $V_{IN\_}$ac is higher than a set voltage, the current turn-off slope control module outputs a turn-off signal to linearly turn off the current flowing through the LED load to further reduce power consumption and improve efficiency, and meanwhile realizes a compromise between efficiency and a power factor through adjusting the turn-off slope of the current flowing through the LED load 12;

Then the input voltage $V_{IN\_}ac$ drops, and when the input voltage $V_{IN\_}ac$ is lower than the set voltage, the turn-off signal is disabled, and the constant current control module 13 performs constant current control to the current flowing through the LED load 12;

The input voltage $V_{IN\_}ac$ continues to drop, and when the input voltage $V_{IN\_}ac$ is lower than the turn-on voltage of the LED load 12, the LED load 12 is turned off.

Specifically, in this embodiment, the set voltage is higher than the operating voltage of the LED load 12. Those skilled in the art can understand that as the input voltage $V_{IN\_}ac$ increases, the LED load 12 is gradually turned on and the voltages at both terminals are stabilized at the operating voltage; as the input voltage $V_{IN\_}ac$ continues to increase, the excess voltage is withstood by the power switch transistor M, which inevitably leads to low efficiency. Therefore, those skilled in the art can set the set voltage for turning off the current flowing through the LED load 12 according to requirements of different operating current and operating voltage, and the specific values are not limited one by one. In this embodiment, the drain terminal voltage $V_{S1}$ of the power switch transistor M is detected through the current turn-off slope control module 14, and in the case of a high input voltage, the loss is reduced and the system efficiency is improved.

Further, the turn-off slope of the current flowing through the LED load 12 is set specifically by detecting an output terminal voltage of the LED load 12 to set a drop point and a turn-off point of the current flowing through the LED load 12.

In this embodiment, corresponding to the drop point of the current flowing through the LED load 12, the drain terminal voltage $V_{S1}$ of the power switch transistor M is set as VLED_DEC=I1*R1, where I1 refers to a constant current of the constant current source, and R1 refers to a resistance of the first resistor; the detected voltage $V_{OV}$ begins to rise from zero, and the current flowing through the LED load 12 begins to drop. Corresponding to the turn-off point of the current flowing through the LED load 12, the drain terminal voltage $V_{S1}$ of the power switch transistor M is set as VLED_OFF=(Vref2/R2+I1)*R1+Vref2, where I1 is the constant current of the constant current source, R1 refers to a resistance of the first resistor, R2 refers to a resistance of the second resistor, and Vref2 refers to a second reference voltage inside the over-voltage detection unit 141; when the detected voltage $V_{OV}$ reaches the second reference voltage Vref2, the current flowing through the LED load 12 is completely turned off.

Figure 6:
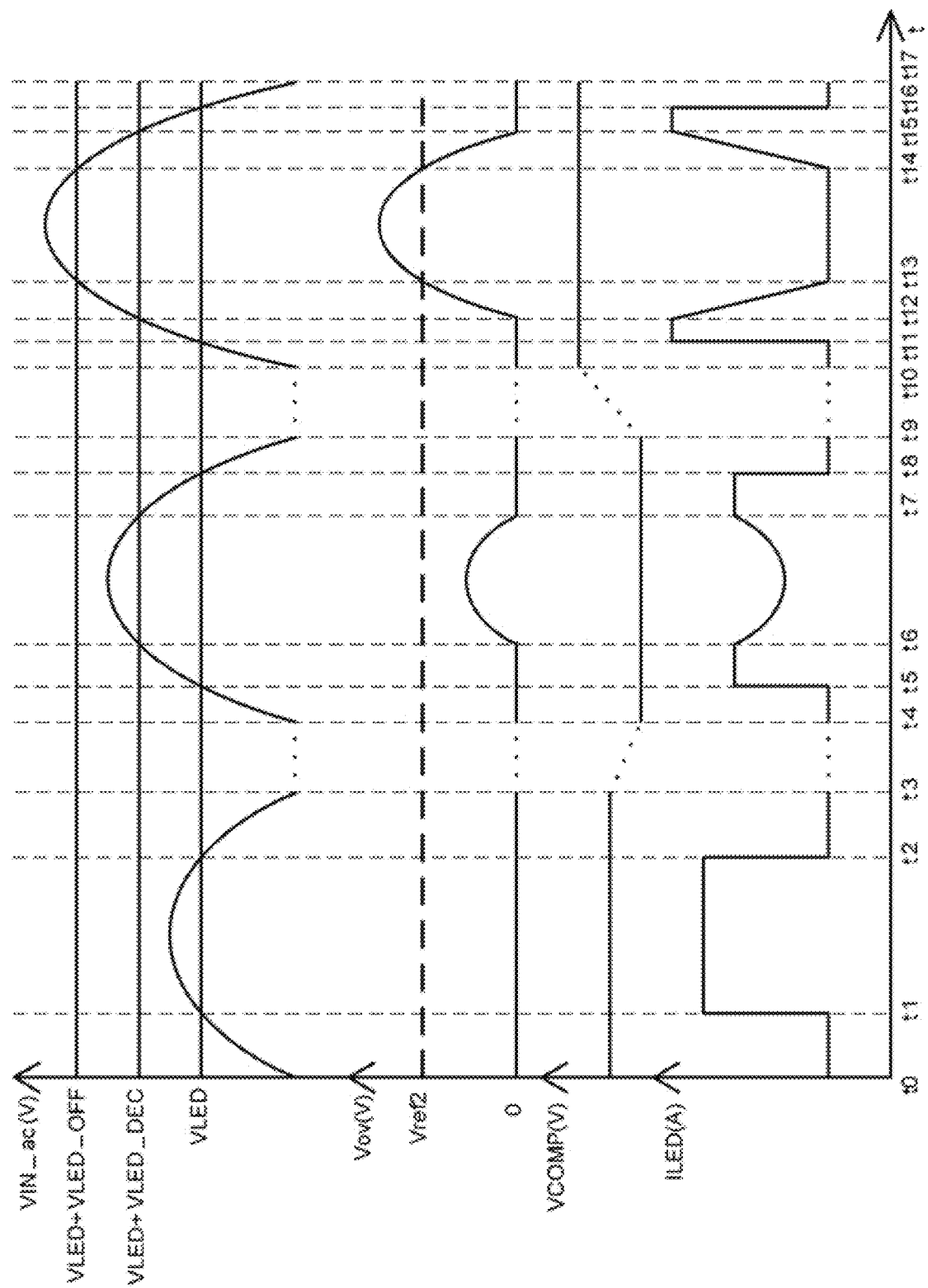
FIG. 6 shows a schematic diagram of the working principle of the LED driving circuit for balancing efficiency and a power factor according to the present invention.

As shown in FIG. 6, the circuit structure of Embodiment 2 is described as an example to illustrate the LED driving method for balancing efficiency and a power factor; during different input voltage periods, the average values of the currents flowing through the LED load 12 are the same. The specific working process is as follows:

At time t0, $V_{IN\_}ac$<VLED (VLED is a turn-on voltage of the LED load 12), the LED load 12 is not turned on and no current flows through the LED load 12; at the beginning of time t1, $V_{IN\_}ac$>VLED, the LED load 12 begins to be turned on, the peak current flowing through the LED load 12 is determined by a voltage VCOMP on the compensation capacitor Ccomp; during the period of t1-t2, VLED<$V_{IN\_}ac$<VLED+VLED_DEC, and therefore the current flowing through the LED load 12 maintains constant; after time t2, $V_{IN\_}ac$<VLED, the LED load 12 is turned off again, and the period ends till time t3. The average current of the LED load during the period of t0-t3 is maintained at a set value. During the whole process, no current flows in the current turn-off slope control module 14, and the related detected voltage $V_{OV}$ is always zero.

At time t4, another AC period with different input voltage amplitude begins; during the period of t4-t5, $V_{IN\_}ac$<VLED and the LED load 12 is turned off; during the period of t5-t6, VLED<$V_{IN\_}ac$<VLED+VLED_DEC, the LED load 12 is turned on in this case, the peak current flowing through the LED load 12 is determined by the voltage VCOMP on the compensation capacitor Ccomp and remains constant; during the period of t6-t7, VLED+VLED_DEC<$V_{IN\_}ac$<VLED+VLED_OFF, and in this case, the detected voltage VOV increases with the increase of the input voltage $V_{IN\_}ac$, but its amplitude does not reach the second reference voltage Vref2, the current flowing through the load 12 varies with the voltage change of the input voltage $V_{IN\_}ac$ and is inversely proportional to the input voltage $V_{IN\_}ac$, that is, the current flowing through the LED load 12 drops with the increase of the input voltage $V_{IN\_}ac$; during the period of t7-t8, VLED+VLED_DEC>$V_{IN\_}ac$>VLED, the current flowing through the LED load 12 is clamped by the voltage VCOMP on the compensation capacitor Ccomp. A period ends at time t9, the average current in the period of t4-t9 is the same as the average current in the period of t0-t3. This is done by integrating the compensation capacitor Ccomp.

At time t10, another period begins; during the period of t10-t11, $V_{IN\_}ac$<VLED, the LED load 12 is turned off and the current is zero; after the time t11, the LED load 12 is turned on; during the period of t11-t12 and the current is determined by the voltage VCOMP on the compensation capacitor Ccomp; during the period of t12-t13, $V_{IN\_}ac$>VLED+VLED_DEC, the current begins to drop linearly with the increase of the detected voltage $V_{OV}$; at time t13, $V_{IN\_}ac$=VLED+VLED_OFF, the detected voltage $V_{OV}$ reaches the second reference voltage Vref2 and the current drops to zero; during the period of t13-t14, $V_{IN\_}ac$ is always higher than VLED+VLED_OFF, the detected voltage VOV is always higher than the second reference voltage Vref2, and the LED load 12 is always turned off; during the period of t14-t15, VLED+VLED_DEC<$V_{IN\_}ac$<VLED+VLED_OFF, and the current flowing through the LED load 12 linearly increases; after time t15, $V_{IN\_}ac$<VLED+VLED_DEC, the current flowing through the LED load 12 is clamped and controlled again by the voltage VCOMP on the compensation capacitor Ccomp; after time t16, $V_{IN\_}ac$<VLED, the LED load 12 is not turned off any longer and the current drops to zero, and one period ends at time t17. Similarly, the average current of the LED in the period of t10-t17 is consistent with those in the previous two periods.

According to the present invention, the current flowing through the LED load is turned off at a high input voltage to reduce the loss on the power switch transistor M and improve the overall efficiency; furthermore, the drop point and the turn-off point of the current are set for balancing efficiency and the power factor. Meanwhile, due to the integration of the compensation capacitor Ccomp, the average current in the entire period can be kept consistent, so as to realize the constant power output in a wide input voltage range.

Figure 7:
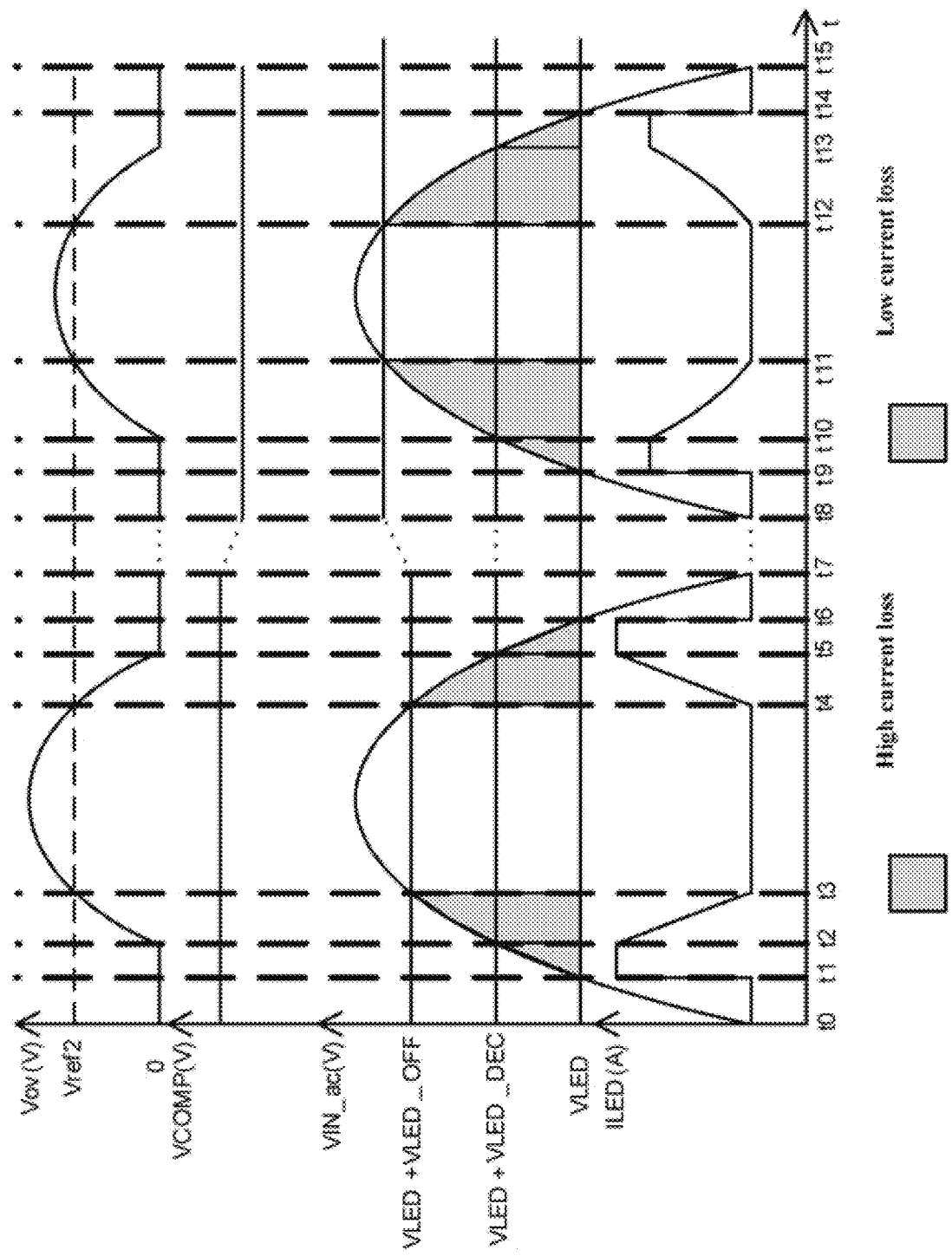
FIG. 7 shows a schematic diagram of the principle of an LED driving method for balancing efficiency and a power factor according to the present invention.

FIG. 7 shows waveforms of output LED currents obtained by setting different VLED_OFF under the same condition. The current change slope set at the period of t0-t7 is larger than the current change slope set at the period of t8-t15, so the turn-on time is relatively short and the loss is relatively small correspondingly (the shaded parts in FIG. 7 refer to high current loss and low current loss, respectively), the efficiency will be higher, but the power factor will be lower. By adjusting R1, R2 and I1 to set different VLED_DEC and VLED_OFF, the slope of the output LED current change can be set, so as to realize a balance between the efficiency and the power factor.

As described above, the LED driving circuit and method for balancing efficiency and a power factor provided in the present invention have the following beneficial effects:

1. According to the LED driving circuit and method for balancing efficiency and a power factor provided in the present invention, the average current in an AC period is controlled by the compensation capacitor and the peak current is limited to realize the constant power output in a wide range of input voltage.

2. According to the LED driving circuit and method for balancing efficiency and a power factor provided in the present invention, the turn-off voltage of an LED is adjusted by an external resistor, and the LED is turned off to achieve high efficiency of the system when the input voltage is relatively high.

3. According to the LED driving circuit and method for balancing efficiency and a power factor provided in the present invention, the turn-off slope of the LED is adjusted through an external resistor to achieve a compromise between efficiency and the power factor and also optimize the electromagnetic interference performance of the system.

4. According to the LED driving circuit and method for balancing efficiency and a power factor provided in the present invention, the structure of the current source is adopted to realize the effect of setting two mutually independent voltage detection points through one pin, thus saving the pin number of a chip and achieving the simplest peripheral circuit.

To sum up, the present invention provides an LED driving circuit and method for balancing efficiency and a power factor. The LED driving circuit for balancing efficiency and a power factor includes a voltage input module, an LED load, a constant current control module and a current turn-off slope control module; the voltage input module is configured to provide an input voltage; the LED load is connected to an output terminal of the voltage input module and is powered by the voltage input module; the constant current control module is connected to an output terminal of the LED load to perform constant current control to the LED load; the current turn-off slope control module is connected to an input terminal or an output terminal of the LED load, and when the input voltage is higher than a set voltage, the current turn-off slope control module outputs a turn-off signal to linearly turn off a current flowing through the LED load, and realizes a balance between efficiency and a power factor by adjusting the turn-off slope of the current flowing through the LED load. The power switch transistor is turned on, and when an input voltage is higher than a turn-on voltage of the LED load, the LED load 12 is turned on, and the constant current control module performs constant current control to the current flowing through the LED load; the input voltage continuous to increase, and when the input voltage is higher than a set voltage, the current turn-off slope control module outputs a turn-off signal to linearly turn off the current flowing through the LED load to further reduce power consumption and improve efficiency, and meanwhile realizes a compromise between efficiency and a power factor through adjusting the turn-off slope of the current flowing through the LED load; and then the input voltage drops, and when the input voltage is lower than the set voltage, the turn-off signal is disabled, and the constant current control module performs constant current control to the current flowing through the LED load; the input voltage continues to drop, and when the input voltage is lower than the turn-on voltage of the LED load, the LED load is turned off According to the LED driving circuit and method for balancing efficiency and a power factor, provided in the present invention, the average current in an AC period is controlled by the compensation capacitor and the peak current is limited to realize the constant power output in a wide input voltage range; the turn-off voltage of an LED is adjusted by an external resistor, and the LED is turned off to achieve high efficiency of the system when the input voltage is relatively high; the turn-off slope of the LED is adjusted through an external resistor to achieve a compromise between a balance efficiency and the power factor and meanwhile optimize the electromagnetic interference performance of the system; and the structure of the current source is adopted to realize the effect of setting two mutually independent voltage detection points through one pin, thus reducing the pin number of a chip and achieving the simplest peripheral circuit. Therefore, the present invention effectively overcomes various disadvantages of the prior art and has a high value in industrial use.

The above-mentioned embodiments are just used for exemplarily describing the principle and effects of the present invention instead of limiting the present invention. One skilled in the art may make modifications or changes to the above-mentioned embodiments without departing from the spirit and the scope of the present invention. Therefore, all equivalent modifications or changes made by one skilled having common knowledge in the art without departing from the spirit and technical concept disclosed by the present invention shall be still covered by the claims of the present invention.

What is claimed is:

1. A LED driving circuit with function off balancing efficiency and power factor comprises:
   a voltage input module, an LED load, a constant current control module and a current turn-off slope control module; wherein
   the voltage input module is configured to provide an input voltage;
   the LED load is connected to an output terminal of the voltage input module and is powered by the voltage input module;
   the constant current control module is connected to an output terminal of the LED load to perform constant current control to the LED load;
   the current turn-off slope control module is connected to an input terminal or an output terminal of the LED load, and when the input voltage is higher than a set voltage, the current turn-off slope control module outputs a turn-off signal to linearly turn off the current flowing through the LED load and realize a compromise between efficiency and a power factor by adjusting the turn-off slope of the current flowing through the LED load;
   the current turn-off slope control module comprises a first resistor, a second resistor, a constant current source and an over-voltage detecting unit;
   one terminal of the first resistor is connected to the output terminal of the LED load, and another terminal of the first resistor is connected to the second resistor and is then grounded; one terminal of the constant current source is connected between the first resistor and the second resistor, and another terminal of the constant current source is grounded; the over-voltage detecting unit is connected between the first resistor and the second resistor to generate a turn-off signal; a turn-off slope of the current flowing through the LED load is adjusted through the first resistor, the second resistor and the constant current source.

2. The LED driving circuit according to claim 1, characterized in that the constant current control module comprises: a power switch transistor, a sampling resistor, a first reference voltage generation unit, and a comparison unit; a drain terminal of the power switch transistor is connected to the output terminal of the LED load, and a source terminal of the power switch transistor is grounded via the sampling resistor; an input terminal of the first reference voltage generation unit is connected to the current turn-off slope control module; a first input terminal of the comparison unit is connected to the source terminal of the power switch transistor, a second input terminal of the comparison unit is connected to the first reference voltage generation unit, and an output terminal of the comparison unit is connected to a gate terminal of the power switch transistor.

3. A method for balancing efficiency and power factor for a LED driving circuit according to claim 2 comprising the following steps:
  turning on the power switch transistor, and when an input voltage is higher than a turn-on voltage of the LED load, the LED load is turned on, the constant current control module performs constant current control to the current flowing through the LED load;
  the input voltage continuous to increase, when the input voltage is higher than a set voltage, the current turn-off slope control module outputs a turn-off signal to linearly turn off the current flowing through the LED load so as to further reduce power consumption and improve efficiency and meanwhile realize a compromise between efficiency and a power factor through adjusting a turn-off slope of the current flowing through the LED load;
  then the input voltage drops, when the input voltage is lower than the set voltage, the turn-off signal is disabled, the constant current control module performs constant current control to the current flowing through the LED load;
  the input voltage continues to drop, and when the input voltage is lower than the turn-on voltage of the LED load, the LED load is turned off; and
  the turn-off slope of the current flowing through the LED load is determined by detecting an output terminal voltage of the LED load to set a dropping point and a turn-off point of the current flowing through the LED load.

4. The method according to claim 3, wherein the sampling resistor samples a voltage at a source terminal of the power switch transistor to obtain a sampling voltage, compares the sampling voltage with a first reference voltage and outputs a driving voltage to drive the power switch transistor so as to achieve a constant current control.

5. The method according to claim 3, wherein when the detected voltage increases from zero to a second reference voltage, the current flowing through the LED load drops gradually; and when the detected voltage is higher than the second reference voltage, the current flowing through the LED load is turned off.

6. The method according to claim 5, wherein when the detected voltage begins to increase from zero, the output terminal voltage of the LED load is $I1*R1$, wherein $I1$ refers to a constant current of the constant current source, and $R1$ refers to a resistance of the first resistor.

7. The method according to claim 5, wherein when the detected voltage is a second reference voltage, the output terminal voltage of the LED load is $(Vref2/R2+I1)*R1+Vref2$, wherein $Vref2$ refers to the second reference voltage, $I1$ refers to a constant current of the constant current source, $R1$ refers to a resistance of the first resistor, and $R2$ refers to a resistance of the second resistor.

\* \* \* \* \*